US009854431B2

(12) United States Patent
Lin

(10) Patent No.: US 9,854,431 B2
(45) Date of Patent: *Dec. 26, 2017

(54) METHOD, APPARATUS, AND SYSTEM OF DISTRIBUTING DATA OF VIRTUAL SUBSCRIBER IDENTITY MODULE

(71) Applicant: Huawei Technologies Co., Ltd., Shenzhen (CN)

(72) Inventor: Jixiong Lin, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/595,546

(22) Filed: May 15, 2017

(65) Prior Publication Data
US 2017/0251359 A1 Aug. 31, 2017

Related U.S. Application Data

(63) Continuation of application No. 14/900,804, filed as application No. PCT/CN2014/075699 on Apr. 18, 2014, now Pat. No. 9,686,674.

(51) Int. Cl.
H04W 8/20 (2009.01)
H04L 29/06 (2006.01)
(Continued)

(52) U.S. Cl.
CPC .......... *H04W 8/205* (2013.01); *G06K 7/1417* (2013.01); *H04L 63/0853* (2013.01);
(Continued)

(58) Field of Classification Search
CPC ..... H04W 8/205; H04W 12/06; H04W 60/04; H04W 8/183; H04W 12/02; H04L 63/0853; G06K 7/1417
See application file for complete search history.

(56) References Cited

U.S. PATENT DOCUMENTS 6,873,609 B1 3/2005 Jones et al.
7,693,506 B1* 4/2010 Back .................... H04W 60/00
455/432.1
(Continued)

FOREIGN PATENT DOCUMENTS

CN 101222771 A 7/2008
CN 102917339 A 2/2013
(Continued)

OTHER PUBLICATIONS

Machine Translation and Abstract of Chinese Publication No. CN101222771, Jul. 16, 2008, 18 pages.
(Continued)

Primary Examiner — Brandon Miller
(74) Attorney, Agent, or Firm — Conley Rose, P.C.

(57) ABSTRACT

A method, an apparatus, and a system for distributing data of a virtual subscriber identity module (VSIM) where a terminal device acquires a graphic code from a distribution client; acquires the temporary data of the VSIM and the service authentication code that are included in the graphic code; registers with a mobile network according to the temporary data of the VSIM; connects to the management server through the mobile network; sends to the management server, a request for downloading formal data of the VSIM; and if the authentication is passed, the management server acquires formal data that is of the VSIM and corresponding to the service authentication code, and sends the formal data of the VSIM to the terminal device.

20 Claims, 5 Drawing Sheets

(51) Int. Cl.
*G06K 7/14* (2006.01)
*H04W 8/18* (2009.01)
*H04W 60/04* (2009.01)
*H04W 12/06* (2009.01)
*H04W 12/02* (2009.01)

(52) U.S. Cl.
CPC ........... *H04W 8/183* (2013.01); *H04W 12/02* (2013.01); *H04W 12/06* (2013.01); *H04W 60/04* (2013.01)

(56) References Cited

U.S. PATENT DOCUMENTS

| | | |
|---|---|---|
| 2006/0293085 A1 | 12/2006 | Lauper |
| 2008/0260149 A1 | 10/2008 | Gehrmann |
| 2010/0248690 A1* | 9/2010 | Biggs ................. H04W 36/385 455/411 |
| 2012/0108204 A1* | 5/2012 | Schell .................. H04W 8/205 455/411 |
| 2012/0282924 A1* | 11/2012 | Tagg ....................... H04W 8/04 455/432.1 |
| 2013/0095795 A1* | 4/2013 | Shi .......................... H04L 61/20 455/411 |
| 2013/0151590 A1 | 6/2013 | Feng |
| 2015/0215773 A1 | 7/2015 | Bai et al. |

FOREIGN PATENT DOCUMENTS

| | | |
|---|---|---|
| CN | 103237034 A | 8/2013 |
| CN | 103327109 A | 9/2013 |
| CN | 103347257 A | 10/2013 |
| CN | 103414765 A | 11/2013 |
| CN | 103501493 A | 1/2014 |
| EP | 1571590 A1 | 9/2005 |
| EP | 2857948 A1 | 4/2015 |
| EP | 2861002 A1 | 4/2015 |
| EP | 2897394 A1 | 7/2015 |
| EP | 2903389 A1 | 8/2015 |
| WO | 2009071146 A1 | 6/2009 |
| WO | 2014048130 A1 | 4/2014 |
| WO | 2014206267 A1 | 12/2014 |

OTHER PUBLICATIONS

Machine Translation and Abstract of Chinese Publication No. CN103237034, Aug. 7, 2013, 5 pages.
Machine Translation and Abstract of Chinese Publication No. CN103501493, Jan. 8, 2014, 4 pages.
Foreign Communication From A Counterpart Application, European Application No. 14889655.8, Extended European Search Report dated Jun. 3, 2016, 13 pages.
Foreign Communication From A Counterpart Application, PCT Application No. PCT/CN2014/075699, English Translation of International Search Report dated Jan. 20, 2015, 2 pages.
Foreign Communication From A Counterpart Application, PCT Application No. PCT/CN2014/075699, English Translation of Written Opinion dated Jan. 20, 2015, 11 pages.
Notice of Allowance dated Feb. 13, 2017, 21 pages, U.S. Appl. No. 14/900,804, filed Dec. 22, 2015.

* cited by examiner

METHOD, APPARATUS, AND SYSTEM OF DISTRIBUTING DATA OF VIRTUAL SUBSCRIBER IDENTITY MODULE

CROSS-REFERENCE TO RELATED APPLICATIONS

This application is a continuation of U.S. patent application Ser. No. 14/900,804, filed on Dec. 22, 2015, which is a National Stage of International Patent Application No. PCT/CN2014/075699, filed on Apr. 18, 2014. The aforementioned patent applications are hereby incorporated by reference in their entireties.

TECHNICAL FIELD

The present disclosure relates to mobile communications technologies, and in particular, to a method, an apparatus, and a system for distributing data of a virtual subscriber identity module (VSIM).

BACKGROUND

A subscriber identity module (SIM) included in a conventional terminal device exists in a form of a physical card, and a VSIM may replace the physical SIM card to implement a function of the physical SIM card. The function includes storing subscriber data, for example, an international mobile subscriber identity (IMSI); and an encryption algorithm and information about a key that are in the SIM, where the encryption algorithm includes A3 and A8 and may be preset in a terminal device, and the information about a key includes a Key identifier (Ki). The Ki is a key for transferring encrypted data between the SIM card and an operator, and the Ki cooperates with the IMSI and serves as an authentication key for authentication of a subscriber identity when the terminal device accesses a network via the card. The Ki of the SIM card of a mobile phone is cracked, numerous phone cards of a same number may be copied. After a VSIM is used, a mobile operator may not use an entity SIM to bind a telephone number to a terminal. While the mobile operator directly provides the VSIM to the terminal, which reduces a cost of accessing a network by a subscriber, a production cost of the terminal, and operating and management costs of the mobile operator.

However, an existing distributing method of a VSIM requires that the terminal device must have a function of accessing a network to acquire installation information of a VSIM, which limits distribution and application of the VSIM.

SUMMARY

In view of this, embodiments of the present disclosure provide a method, an apparatus, and a system for distributing data of a virtual subscriber identity module, so as to solve a problem that only a terminal device that must have a function of accessing a network can acquire installation information of a VSIM.

According to a first aspect, an embodiment of the present disclosure provides a method for distributing data of a VSIM, including acquiring, by a terminal device, a graphic code from a distribution client, where the graphic code includes temporary data of a VSIM and a service authentication code, and the graphic code is provided by a management server to the distribution client; acquiring, by the terminal device, the temporary data of the VSIM and the service authentication code that are included in the graphic code; registering, by the terminal device, with a mobile network according to the temporary data of the VSIM, and connecting to the management server through the mobile network; sending, by the terminal device to the management server, a request for downloading formal data of the VSIM, where the request for downloading the formal data of the VSIM carries the service authentication code, so that the management server performs authentication on the terminal device according to the service authentication code; and if the authentication is passed, the management server acquires formal data that is of the VSIM and corresponding to the service authentication code, and sends the formal data of the VSIM to the terminal device; receiving, by the terminal device, the formal data of the VSIM that is sent by the management server; and registering, by the terminal device, with the mobile network according to the formal data of the VSIM.

With reference to the first aspect, in a first possible implementation manner of the first aspect, the temporary data of the VSIM is temporarily valid, and is deregistered after the terminal device receives the formal data of the VSIM that is sent by the management server, so that the terminal device reregisters with the mobile network according to the formal data of the VSIM.

With reference to the first aspect or the first possible implementation manner of the first aspect, in a second possible implementation manner of the first aspect, the graphic code is a two-dimensional code.

With reference to the first aspect and either of the first and the second possible implementation manners of the first aspect, in a third possible implementation manner of the first aspect, the acquiring, by the terminal device, the temporary data of the VSIM and the service authentication code that are included in the graphic code includes scanning, by the terminal device, the graphic code to acquire the temporary data of the VSIM and the service authentication code that are included in the graphic code.

With reference to the first aspect and any one of the first to the third possible implementation manners of the first aspect, in a fourth possible implementation manner of the first aspect, the acquiring, by a terminal device, a graphic code from a distribution client includes acquiring, by the terminal device, the graphic code from the distribution client using a camera.

With reference to the first aspect and any one of the first to the fourth possible implementation manners of the first aspect, in a fifth possible implementation manner of the first aspect, before the registering, by the terminal device, with a mobile network according to the temporary data of the VSIM, the method further includes storing, by the terminal device, the temporary data of the VSIM, and writing the stored temporary data of the VSIM to a modem of the terminal device; and before the registering, by the terminal device, with the mobile network according to the formal data of the VSIM, the method further includes storing, by the terminal device, the formal data of the VSIM, and writing the stored formal data of the VSIM to the modem of the terminal device, so as to overwrite the temporary data of the VSIM that has been written to the modem.

According to a second aspect, an embodiment of the present disclosure provides a method for distributing data of a VSIM, including encapsulating, by a management server, temporary data of a VSIM and a service authentication code in a graphic code, where the service authentication code is used by a terminal device to download formal data of the VSIM; providing, by the management server, the graphic code to a distribution client, so that the terminal device acquires the graphic code from the distribution client, further acquires the temporary data of the VSIM and the service authentication code, registers with a mobile network according to the temporary data of the VSIM, and sends, to the management server according to the service authentication code, a request for downloading the formal data of the VSIM; receiving, by the management server, the request, sent by the terminal device, for downloading the formal data of the VSIM, where the request for downloading the formal data of the VSIM carries the service authentication code; performing, by the management server, authentication on the terminal device according to the service authentication code; and if the authentication is passed, sending, by the management server, formal data that is of the VSIM and corresponding to the service authentication code to the terminal device.

With reference to the second aspect, in a first possible implementation manner of the second aspect, before the sending, by the management server, formal data that is of the VSIM and corresponding to the service authentication code to the terminal device, the method further includes determining, by the management server, that a state of the formal data that is of the VSIM and corresponding to the service authentication code is an unused state; and after the sending, by the management server, formal data that is of the VSIM and corresponding to the service authentication code to the terminal device, the method further includes marking, by the management server, the state of the formal data of the VSIM as a used state.

With reference to the second aspect or the first possible implementation manner of the second aspect, in a second possible implementation manner of the second aspect, the graphic code is a two-dimensional code.

With reference to the second aspect and either of the first and the second possible implementation manners of the second aspect, in a third possible implementation manner of the second aspect, after the sending, by the management server, formal data that is of the VSIM and corresponding to the service authentication code to the terminal device, the method further includes sending, by the management server to the mobile network, a request for deregistering the temporary data of the VSIM, so that a mobile switching center (MSC) on the mobile network deregisters the temporary data of the VSIM, and the terminal device registers with the mobile network according to the formal data of the VSIM.

According to a third aspect, an embodiment of the present disclosure provides a terminal device, including a first acquiring module configured to acquire a graphic code from a distribution client, where the graphic code includes temporary data of a VSIM and a service authentication code, and the graphic code is provided by a management server to the distribution client; a second acquiring module configured to acquire the temporary data of the VSIM and the service authentication code that are included in the graphic code; a network processing module configured to register with a mobile network according to the temporary data of the VSIM, and connect to the management server through the mobile network; a sending module configured to send, to the management server, a request for downloading formal data of the VSIM, where the request for downloading the formal data of the VSIM carries the service authentication code, so that the management server performs authentication on the terminal device according to the service authentication code; and if the authentication is passed, the management server acquires formal data that is of the virtual subscriber identity module and corresponding to the service authentication code, and sends the formal data of the VSIM to the terminal device; and a receiving module configured to receive the formal data of the VSIM that is sent by the management server, where the network processing module is further configured to register with the mobile network according to the formal data of the VSIM.

With reference to the third aspect, in a first possible implementation manner of the third aspect, the temporary data of the VSIM is temporarily valid, and is deregistered after the terminal device receives the formal data of the VSIM that is sent by the management server, so that the terminal device reregisters with the mobile network according to the formal data of the VSIM.

With reference to the third aspect or the first possible implementation manner of the third aspect, in a second possible implementation manner of the third aspect, the graphic code is a two-dimensional code.

With reference to the third aspect and either of the first and the second possible implementation manners of the third aspect, in a third possible implementation manner of the third aspect, the second acquiring module is configured to scan the graphic code to acquire the temporary data of the VSIM and the service authentication code that are included in the graphic code.

With reference to the third aspect and any one of the first to the third possible implementation manners of the third aspect, in a fourth possible implementation manner of the third aspect, the first acquiring module is configured to acquire the graphic code from the distribution client using a camera.

With reference to the third aspect and any one of the first to the fourth possible implementation manners of the third aspect, in a fifth possible implementation manner of the third aspect, the terminal device further includes a storage module and a writing module, where the storage module is configured to, before the network processing module registers with the mobile network according to the temporary data of the VSIM, store the temporary data of the VSIM; the writing module is configured to write the temporary data that is of the VSIM and stored by the storage module to a modem of the terminal device; the storage module is further configured to, before the network processing module registers with the mobile network according to the formal data of the VSIM, store the formal data of the VSIM; and the writing module is further configured to write the stored formal data of the VSIM to the modem of the terminal device, so as to overwrite the temporary data of the VSIM that has been written to the modem.

According to a fourth aspect, an embodiment of the present disclosure provides a management server, including a graphic code encapsulating module configured to encapsulate temporary data of a VSIM and a service authentication code in a graphic code, where the service authentication code is used by a terminal device to download formal data of the VSIM; a providing module configured to provide the graphic code to a distribution client, so that the terminal device acquires the graphic code from the distribution client, further acquires the temporary data of the VSIM and the service authentication code, registers with a mobile network according to the temporary data of the VSIM, and sends, to the management server according to the service authentication code, a request for downloading the formal data of the VSIM; a receiving module configured to receive the request, sent by the terminal device, for downloading the formal data of the VSIM, where the request for downloading the formal data of the VSIM carries the service authentication code; an authentication module configured to perform authentication on the terminal device according to the service authentication code; and a sending module configured to, if the authentication module passes the authentication, send formal data that is of the VSIM and corresponding to the service authentication code to the terminal device.

With reference to the fourth aspect, in a first possible implementation manner of the fourth aspect, before the sending module sends the formal data that is of the VSIM and corresponding to the service authentication code to the terminal device, the authentication module is further configured to determine that a state of the formal data that is of the VSIM and corresponding to the service authentication code is an unused state; and after the sending module sends the formal data that is of the VSIM and corresponding to the service authentication code to the terminal device, the authentication module is further configured to mark the state of the formal data of the VSIM as a used state.

With reference to the fourth aspect or the first possible implementation manner of the fourth aspect, in a second possible implementation manner of the fourth aspect, the graphic code is a two-dimensional code.

With reference to the fourth aspect and either of the first and the second possible implementation manners of the fourth aspect, in a third possible implementation manner of the fourth aspect, after sending the formal data that is of the VSIM and corresponding to the service authentication code to the terminal device, the sending module is further configured to send, to the mobile network, a request for deregistering the temporary data of the VSIM, so that an MSC on the mobile network deregisters the temporary data of the VSIM, and the terminal device registers with the mobile network according to the formal data of the VSIM.

According to a fifth aspect, an embodiment of the present disclosure provides a terminal device, including a processor, a memory, a modem, a first interface, and a second interface that are connected using a bus, where the first interface is configured to acquire a graphic code from a distribution client, where the graphic code includes temporary data of a VSIM and a service authentication code, and the graphic code is provided by a management server to the distribution client; the memory is configured to store program code, and the processor executes the program code so as to implement the following steps: acquiring, from the graphic code acquired by the first interface, the temporary data of the VSIM and the service authentication code that are included in the graphic code; storing, in the memory, the temporary data of the VSIM and the service authentication code, and writing the temporary data of the VSIM to the modem; invoking the second interface so as to register with a mobile network according to the temporary data of the VSIM, and connect to the management server through the mobile network; send, to the management server, a request for downloading formal data of the VSIM, where the request for downloading the formal data of the VSIM carries the service authentication code, so that the management server performs authentication on the terminal device according to the service authentication code; and if the authentication is passed, the management server acquires formal data that is of the virtual subscriber identity module and corresponding to the service authentication code, and sends the formal data of the VSIM to the terminal device; and receive the formal data of the VSIM that is sent by the management server; storing, in the memory, the formal data of the VSIM that is received by the second interface, and writing the formal data of the VSIM to the modem, so as to overwrite the temporary data of the VSIM that has been written to the modem; and invoking the second interface so as to register with the mobile network according to the formal data of the VSIM.

With reference to the fifth aspect, in a first possible implementation manner of the fifth aspect, the first interface is a camera; and the processor invokes the camera to acquire the graphic code from the distribution client.

According to a sixth aspect, an embodiment of the present disclosure provides a management server, including a processor, a memory, a first interface, and a second interface that are connected using a bus, where the memory is configured to store temporary data of a VSIM, a service authentication code, formal data of the VSIM, and program code, and the processor executes the program code so as to implement the following steps: encapsulating the temporary data of the VSIM and the service authentication code in a graphic code; invoking the first interface to provide the graphic code to a distribution client, so that a terminal device acquires the graphic code from the distribution client, further acquires the temporary data of the VSIM and the service authentication code that are included in the graphic code, registers with a mobile network according to the temporary data of the VSIM, and sends, to the management server according to the service authentication code, a request for downloading the formal data of the VSIM; invoking the second interface to receive the request, sent by the terminal device, for downloading the formal data of the VSIM, where the request for downloading the formal data of the VSIM carries the service authentication code; performing authentication on the terminal device according to the service authentication code; determining that a state of the formal data that is of the VSIM and corresponding to the service authentication code is an unused state; if the authentication is passed and it is determined that the state of the formal data of the VSIM is the unused state, invoking the second interface to send the formal data that is of the VSIM and corresponding to the service authentication code to the terminal device; and marking the state of the formal data of the VSIM as a used state.

According to a seventh aspect, an embodiment of the present disclosure provides a system for distributing data of a VSIM, including at least one terminal device according to the fifth aspect or the first possible implementation manner of the fifth aspect, and the management server according to the sixth aspect, and a distribution client.

Using the solutions, according to the embodiments provided in the present disclosure, a terminal device acquires, from a distribution client, a graphic code that includes temporary data of a VSIM and a service authentication code, so as to register with a mobile network according to the temporary data of the VSIM, and further connect to a management server to download formal data that is of the VSIM and corresponding to the service authentication code, which overcomes a problem that distribution of data of a VSIM is limited because an existing terminal device needs to have a network connection capability to acquire data of the VSIM from the management server. The temporary data of the VSIM and the service authentication code are acquired from the distribution client and further the formal data of the VSIM is acquired from the management server according to the service authentication code, which increases security, flexibility, and convenience of acquiring the data of the VSIM by the terminal device, and improves efficiency in distributing the data of the VSIM.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DETAILED DESCRIPTION

To make the objectives, technical solutions, and advantages of the present disclosure clearer, the following further describes the present disclosure in detail with reference to the accompanying drawings. The described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
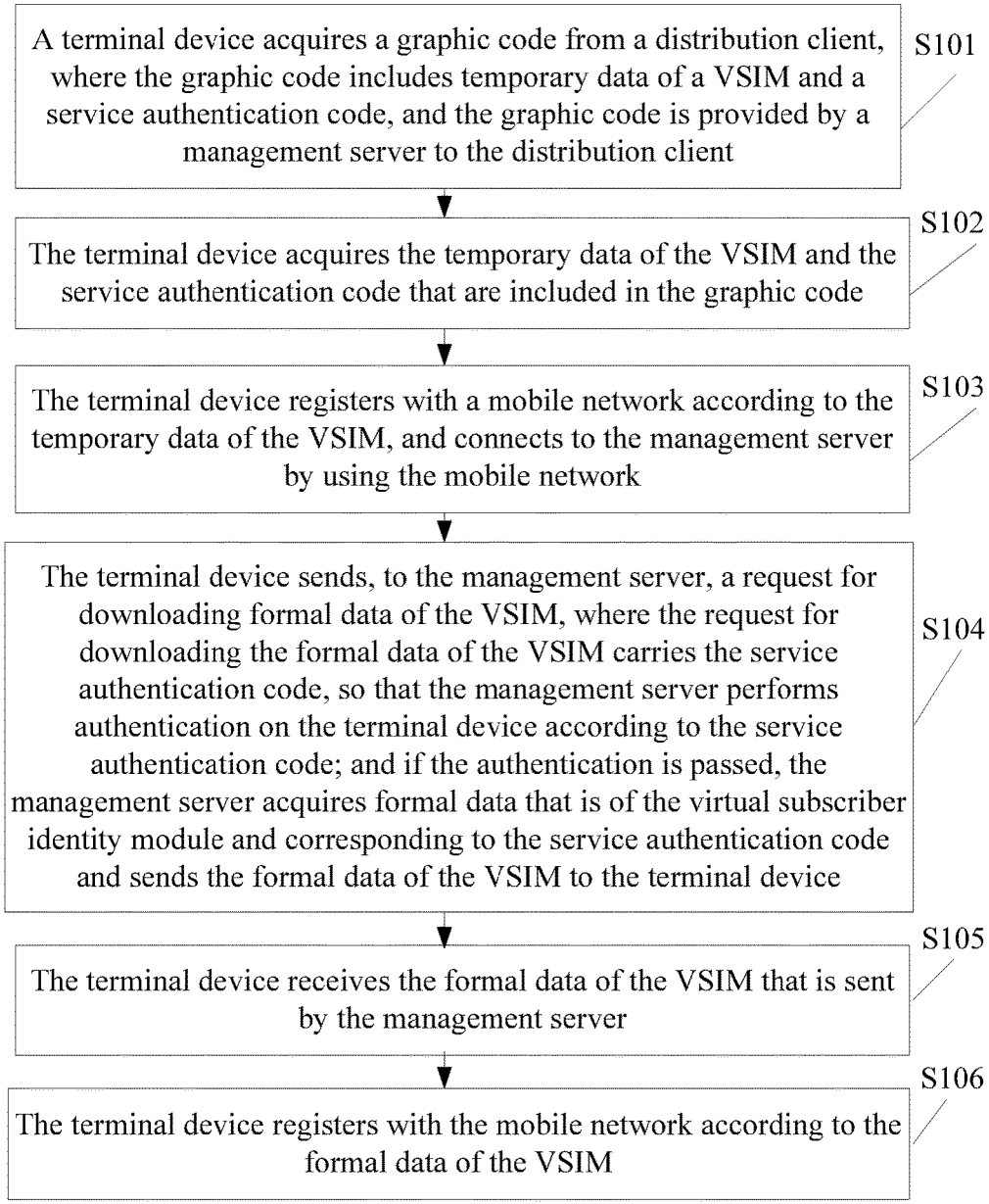
FIG. 1 is a flowchart of Embodiment 1 of a method for distributing data of a VSIM according to the present disclosure.

FIG. 1 is a flowchart of Embodiment 1 of a method for distributing data of a VSIM according to the present disclosure. The method embodiment is performed by a terminal device, where the terminal device may support use of the data of a VSIM. As shown in FIG. 1, the method embodiment includes the following steps.

S101. A terminal device acquires a graphic code from a distribution client, where the graphic code includes temporary data of the VSIM and a service authentication code, and the graphic code is provided by a management server to the distribution client.

S102. The terminal device acquires the temporary data of the VSIM and the service authentication code that are included in the graphic code.

S103. The terminal device registers with a mobile network according to the temporary data of the VSIM, and connects to the management server through the mobile network.

Before the terminal device registers with the mobile network according to the temporary data of the VSIM, the method further includes storing, by the terminal device, the temporary data of the VSIM, and writing the stored temporary data of the VSIM to a modem (Modem) of the terminal device.

S104. The terminal device sends, to the management server, a request for downloading formal data of the VSIM, where the request for downloading the formal data of the VSIM carries the service authentication code, so that the management server performs authentication on the terminal device according to the service authentication code; and if the authentication is passed, the management server acquires formal data that is of the virtual subscriber identity module and corresponding to the service authentication code, and sends the formal data of the VSIM to the terminal device.

S105. The terminal device receives the formal data of the VSIM that is sent by the management server.

S106. The terminal device registers with the mobile network according to the formal data of the VSIM.

Before the terminal device registers with the mobile network according to the formal data of the VSIM, the method further includes storing, by the terminal device, the formal data of the VSIM, and writing the stored formal data of the VSIM to the modem of the terminal device, so as to overwrite the temporary data of the VSIM that has been written to the modem.

The temporary data of the VSIM is temporarily valid, and is deregistered after the terminal device receives the formal data of the VSIM that is sent by the management server, so that the terminal device reregisters with the mobile network according to the formal data of the VSIM.

Preferably, the graphic code may be a two-dimensional code.

Preferably, S102 includes that the terminal device scans the graphic code to acquire the temporary data of the VSIM and the service authentication code that are included in the graphic code.

Preferably, in S101, that the terminal device acquires the graphic code from the distribution client includes that the terminal device acquires the graphic code from the distribution client using a camera.

The terminal device acquires, from the distribution client, the graphic code in which the temporary data of the VSIM and the service authentication code are encapsulated, acquires the temporary data of the VSIM and the service authentication code from the graphic code, stores the temporary data of the VSIM and the service authentication code, writes the temporary data of the VSIM to the Modem of the terminal device, so as to register with the mobile network according to information included in the temporary data of the VSIM and connect to the management server to acquire a network connection capability. Then, the request for downloading the formal data of the VSIM is sent to the management server, where the request for downloading carries the service authentication code, so that the management server returns corresponding formal data of the VSIM to the terminal device according to the service authentication code. After receiving the formal data of the VSIM, the terminal device stores the formal data of the VSIM, and after writing the formal data of the VSIM to the Modem to overwrite the temporary data of the VSIM, reregisters with the mobile network according to the formal data of the VSIM. Then, the data of the VSIM may be used to provide a function similar to that of a physical SIM card.

During specific implementation, the terminal device acquires the graphic code from the distribution client. The graphic code includes but is not limited to a bar code, a two-dimensional code, or the like, and may be provided in advance by the management server to the distribution client, may be provided to the terminal device by the management server after the distribution client makes a request to the management server according to a requirement of the terminal device, or may be sent by an operator to the distribution client through a network secure channel according to an operating policy and using the management server. According to different distribution clients, the graphic code may be provided in a manner of a graphic code of a corrugated board or an electronic graphic code. If the graphic code is a graphic code of a corrugated board, a preferable manner is that the graphic code may be provided to the distribution client after a protective film is added to the graphic code so as to improve security of the graphic code and prevent the graphic code from being distributed at a second time. Correspondingly, after the terminal device acquires the graphic code of a corrugated board, the protective film on the graphic code needs to be removed. If the graphic code is an electronic graphic code, a manner of acquiring, by the terminal device, the graphic code from the distribution client includes but is not limited to acquiring the graphic code using a physical connection such as Universal Serial Bus (USB) transmission or network transmission. Preferably, the terminal device may acquire the graphic code from a display device of the distribution client using the camera.

The distribution client may be a distribution point of an existing physical SIM card, and preferably, may also be an added client machine. For a distribution point, the management server mainly provides the graphic code in a form of a corrugated board, and may also include the electronic graphic code. The distribution point may store, on a physical medium, pieces of data of the electronic graphic code one by one in a manner that facilitates distribution, for example, on an optical disc, and a USB flash drive. A manner of the storage medium is not limited, and then the data is provided to the terminal device, so that the terminal device may acquire the graphic code from the physical medium.

For a client machine, the management server mainly sends the electronic graphic code to the distribution client through the secure channel, and the client machine may provide the graphic code to the terminal device in different forms according to a requirement of a user of the terminal device. Methods for providing, by the distribution client, the graphic code to the terminal device to allow the terminal device to acquire data of the VSIM include but are not limited to the following several methods below.

Method 1: The distribution client prints the graphic code on a corrugated board and provides the graphic code to the terminal device, so that the terminal device scans the graphic code on the corrugated board so as to acquire the data of the VSIM.

Method 2: The distribution client displays the graphic code on an interface to the terminal device, so that the terminal device may acquire, using a camera, the graphic code displayed on the interface.

Method 3: The distribution client transmits a two-dimensional code to the terminal device using a physical connection, so that the terminal device stores the graphic code and scans the graphic code to acquire the data of the VSIM, where the physical connection may be transmission through a USB interface, or transmission through a network interface such as BLUETOOTH or local area network Wireless Fidelity (WiFi), which is not limited in the present disclosure.

After the terminal device acquires the graphic code, acquiring the temporary data of the VSIM and the service authentication code in the graphic code may be obtained by scanning the graphic code using graphic code scan software built in the terminal device, where the graphic code scan software includes but is not limited to a bar code reader, and a graphic code scan software such as a two-dimensional code scan software.

The temporary data of the VSIM that is encapsulated in the graphic code by the management server may include but is not limited to an IMSI, a mobile number, and information about a key, such as a Ki. Because the Ki is relatively important, after being encrypted using a fixed password, the Ki may be encapsulated in the graphic code, where the fixed password may be preset in a terminal device that supports the VSIM, so that after acquiring the temporary data of the VSIM, the terminal device may perform decryption processing on information about the encrypted Ki to obtain information about the Ki and write the information about the Ki and the like to a Modem of the terminal device, which in this case is equivalent to inserting an entity SIM card into the terminal device, send the obtained information about the Ki to a mobile network according to information about a key, such as the IMSI and the Ki and using a transceiver such as an antenna. If authentication that is performed using an MSC of the mobile network is passed, the terminal device registers with the mobile network; further connects to the management server through the mobile network; sends, according to service authentication code, to the management server, the request for downloading the formal data of the VSIM; receives the formal data of the VSIM that is sent by the management server; replaces the temporary data of the VSIM that has been written to the Modem with the formal data of the VSIM; and registers with the mobile network according to the formal data of the VSIM.

In this method embodiment, a terminal device acquires, from a distribution client, a graphic code that includes temporary data of a VSIM and a service authentication code, so as to register with a mobile network according to the temporary data of the VSIM, and further connect to a management server to download formal data that is of the VSIM and corresponding to the service authentication code, which overcomes a problem that distribution of data of a VSIM is limited because an existing terminal device needs to have a network connection capability to acquire the data of the VSIM from the management server. The temporary data of the VSIM and the service authentication code are acquired from the distribution client and further the formal data of the VSIM is acquired from the management server according to the service authentication code, which increases security, flexibility, and convenience of acquiring the data of the VSIM by the terminal device, and improves efficiency in distributing the data of the VSIM.

Figure 2:
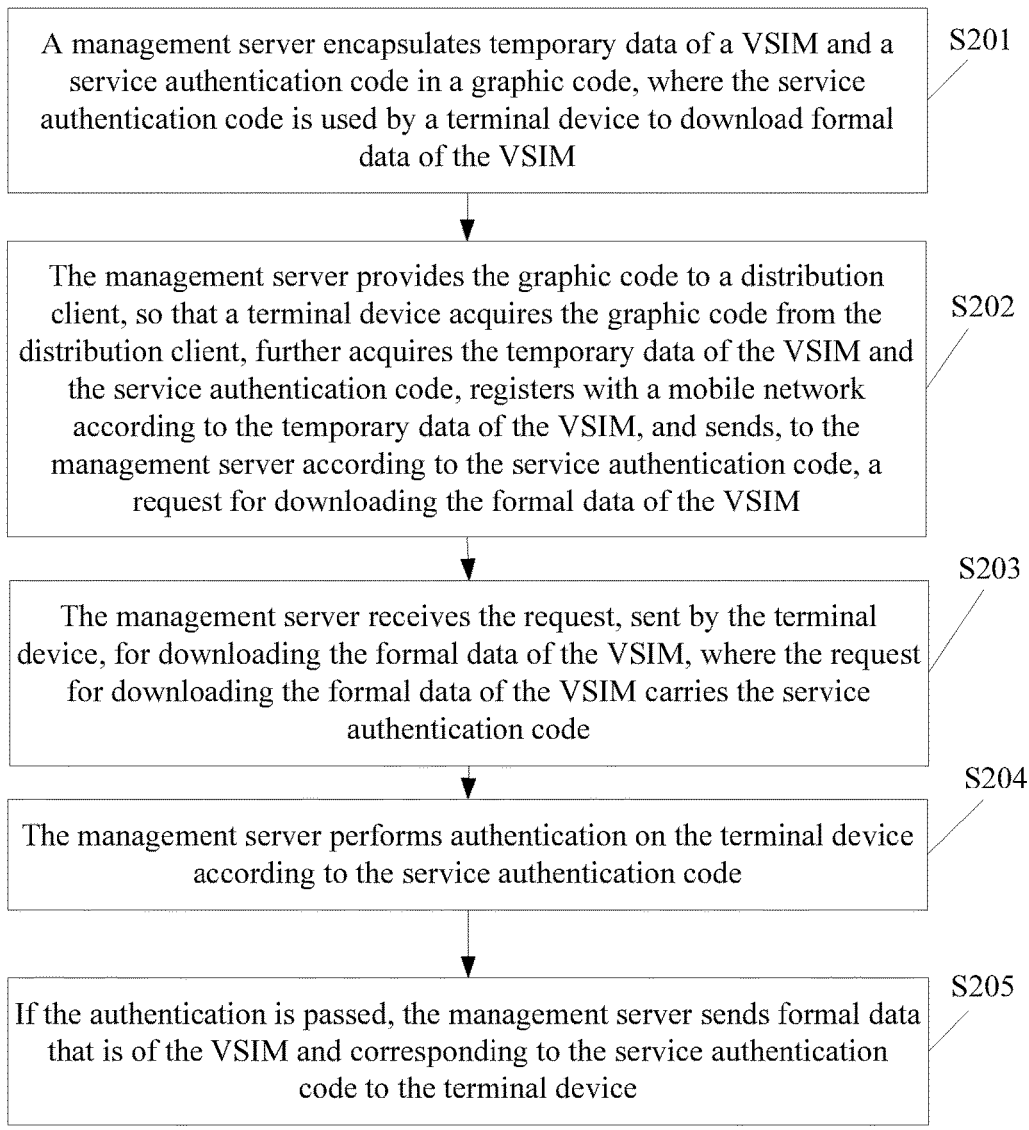
FIG. 2 is a flowchart of Embodiment 2 of a method for distributing data of a VSIM according to the present disclosure.

FIG. 2 is a flowchart of Embodiment 2 of a method for distributing data of a VSIM according to the present disclosure. The method embodiment is performed by a management server, where the management server may be used by an operator to manage the data of a VSIM. As shown in FIG. 2, the method embodiment includes the following steps.

S201. A management server encapsulates temporary data of the VSIM and a service authentication code in a graphic code, where the service authentication code is used by a terminal device to download formal data of the VSIM.

S202. The management server provides the graphic code to a distribution client, so that the terminal device acquires the graphic code from the distribution client, further acquires the temporary data of the VSIM and the service authentication code, registers with a mobile network according to the temporary data of the VSIM, and sends, to the management server according to the service authentication code, a request for downloading the formal data of the VSIM.

The providing, by the management server, the graphic code to the distribution client may be sending the graphic code upon a purchase requirement of the distribution client, may be sending, by an operator, an electronic graphic code to the distribution client through a network secure channel according to an operating policy and using the management server, or may be directly printing, by the management server, the graphic code on corrugated boards, and after a part of the graphic code undergoes shielding protection processing, directly wholesaling the corrugated boards to a distributor, so that the distributor may directly provide two-dimensional codes of the corrugated boards to users of terminal devices. After acquiring the corrugated card, the user removes shielding, scans the graphic code to acquire the temporary data of the VSIM, and registers with the mobile network using an IMSI and information about Ki that are included in the temporary data of the VSIM.

Optionally, at the same time when the management server sends the graphic code to the distribution client, the management server may also simultaneously send the VSIM serial number, which is used to identify uniqueness, generation time, and expiration time of the data of the VSIM, and other data, for example, information that may facilitate use of the user, such as a brand and a price, where the expiration time is used to prompt the terminal device that the temporary data of the VSIM must be used within a specified time.

S203. The management server receives the request, sent by the terminal device, for downloading the formal data of the VSIM, where the request for downloading the formal data of the VSIM carries the service authentication code.

S204. The management server performs authentication on the terminal device according to the service authentication code.

S205. If the authentication is passed, the management server sends formal data that is of the VSIM and corresponding to the service authentication code to the terminal device.

Preferably, in S205, before the management server sends the formal data that is of the VSIM and corresponding to the service authentication code to the terminal device, the method further includes the following step: the management server determines that a state of the formal data that is of the VSIM and corresponding to the service authentication code is an unused state; and if determining that the state of the formal data that is of the VSIM and corresponding to the service authentication code is a used state, the management server rejects sending the formal data of the VSIM to the terminal device, so as to prevent the formal data of the VSIM from being stolen, or ensure that even if the formal data of the VSIM is stolen, the formal data of the VSIM cannot be used to fraudulently use an account of another person to cause a loss to the user.

After the management server sends the formal data that is of the VSIM and corresponding to the service authentication code to the terminal device, the method embodiment further includes the following step: the management server marks the state of the formal data of the VSIM as the used state.

Preferably, the graphic code may be a two-dimensional code.

Optionally, in S205, after the management server sends the formal data that is of a VSIM and corresponding to the service authentication code to the terminal device, the method embodiment further includes the following step: the management server sends a request for deregistering the temporary data of the VSIM to the mobile network, so that an MSC on the mobile network deregisters the temporary data of the VSIM, and the terminal device registers with the mobile network according to the formal data of the VSIM.

The temporary data of the VSIM or formal data of the VSIM may include an IMSI, a mobile number, and information about a key, such as a Ki, and the like. Because information about the Ki is relatively important, after being encrypted using a fixed password, the Ki may be encapsulated in the graphic code, where the fixed password may be preset in a terminal device that supports the VSIM, so that after acquiring the temporary data of the VSIM or the formal data of the VSIM, the terminal device may use the preset fixed password to decrypt information about the encrypted Ki that is included in the temporary data of the VSIM or the formal data of the VSIM to obtain the information about the Ki. The temporary data of the VSIM is temporarily usable, and a main objective of the temporary data of the VSIM is to enable a mobile device to access an operator network or the Internet after the mobile device registers with the mobile network, then connect to the management server and download formal data that is of the VSIM and permanently usable. A use period may be set for the temporary data of the VSIM, and the temporary data of the VSIM becomes invalid after the use period expires. Because the objective of using the temporary data of the VSIM is to download the formal data of the VSIM, control may be performed on a network side so that a terminal device that uses a temporary VSIM to register with a network can access only a specified server, which includes the management server.

After the management server acquires the data of the VSIM from a mobile core network, the acquired data of the VSIM includes the formal data of the VSIM and the temporary data of the VSIM, where the temporary data of the VSIM can be used to connect only to the specified server, for example, the management server. After the temporary data of the VSIM is encrypted, the temporary data of the VSIM and the service authentication code are encapsulated in the graphic code, an electronic graphic code is distributed to the distribution client through the network secure channel, or the graphic code is printed on a corrugated board, shielding protection processing is performed on an area of the graphic code, and the corrugated board is wholesaled to the distribution client. After acquiring the graphic code from the distribution client and further obtaining the temporary data of the VSIM and the service authentication code that are included in the graphic code, the terminal device registers with the mobile network using an IMSI and information about a key that are included in the temporary data of the VSIM. Then, after the terminal device connects to the management server through the mobile network, the management server receives a request, sent by the terminal device, for downloading the formal data of the VSIM, where the request carries the service authentication code, and performs authentication on the terminal device according to the received service authentication code; and if the authentication is passed and it is determined that the state of the formal data that is of the VSIM and corresponding to the service authentication code is the unused state, the management server may send the formal data of the VSIM to the terminal device through the network secure channel, and otherwise, rejects the request, from the terminal device, for downloading the formal data of the VSIM. After sending the formal data of the VSIM to the terminal device, the management server further needs to send a request for deregistering the temporary data of the VSIM to the MSC on the mobile network, so that the MSC deregisters information that is about the temporary data of the VSIM and corresponding to the terminal device, and after receiving the formal data of the VSIM, the terminal device may register with the mobile network using the formal VSIM.

It should be noted that, after successfully providing the formal data of the VSIM to the terminal device, the management server may further invoke a Provisioning system of an operator mobile network to stop using, or recycle corresponding temporary VSIM so as to improve utilization of the temporary VSIM.

In the method embodiment, a management server first provides temporary data of a VSIM and a service authentication code to a distribution client, so that the terminal device may register with a mobile network using the temporary VSIM and further connect to the management server, and then in a case in which authentication is passed and formal data of the VSIM is in an unused state, sends the formal data of the VSIM to the terminal device, which overcomes a problem that distribution of data of a VSIM is limited because the terminal device that does not have a function of accessing a network cannot acquires the data of the VSIM from the management server. In addition, the temporary data of the VSIM and the service authentication code are used to improve security of providing, to a terminal device of a user using the distribution client, the data of the VSIM. Meanwhile, a graphic code that includes the temporary data of the VSIM and the service authentication code is provided to the terminal device using the distribution client, which increases flexibility and convenience of distributing the data of the VSIM, may maintain a system of distributing a physical SIM card of an operator, and cause no impact on an existing operating sale system due to the appearance of the data of the VSIM.

Figure 3:
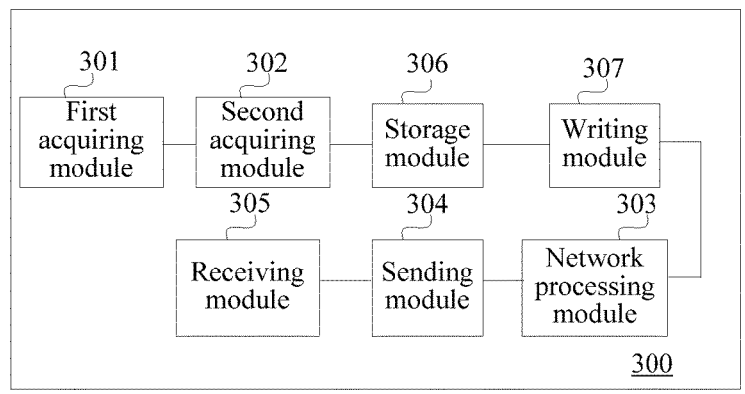
FIG. 3 is a schematic structural diagram of Embodiment 1 of a terminal device according to the present disclosure.

FIG. 3 is a schematic structural diagram of Embodiment 1 of a terminal device according to the present disclosure. As shown in FIG. 3, the terminal device 300 includes a first acquiring module 301, a second acquiring module 302, a network processing module 303, a sending module 304, and a receiving module 305.

The first acquiring module 301 is configured to acquire a graphic code from a distribution client, where the graphic code includes temporary data of a VSIM and a service authentication code, and the graphic code is provided by a management server to the distribution client.

The second acquiring module 302 is configured to acquire the temporary data of the VSIM and the service authentication code that are included in the graphic code.

The network processing module 303 is configured to register with a mobile network according to the temporary data of the VSIM, and connect to the management server through the mobile network.

The sending module 304 is configured to send, to the management server, a request for downloading formal data of the VSIM, where the request for downloading the formal data of the VSIM carries the service authentication code, so that the management server performs authentication on the terminal device according to the service authentication code; and if the authentication is passed, the management server acquires formal data that is of the virtual subscriber identity module and corresponding to the service authentication code, and sends the formal data of the VSIM to the terminal device.

The receiving module 305 is configured to receive the formal data of the VSIM that is sent by the management server.

The network processing module 303 is further configured to register with the mobile network according to the formal data of the VSIM.

The temporary data of the VSIM is temporarily valid, and is deregistered after the terminal device receives the formal data of the VSIM that is sent by the management server, so that the terminal device reregisters with the mobile network according to the formal data of the VSIM.

Preferably, the graphic code may be a two-dimensional code.

Preferably, the second acquiring module 302 is configured to scan the graphic code to acquire the temporary data of the VSIM and the service authentication code that are included in the graphic code.

Preferably, the first acquiring module 301 is configured to acquire the graphic code from the distribution client using a camera.

Further, the terminal device 300 further includes a storage module 306 and a writing module 307, where the storage module 306 is configured to, before the network processing module 303 registers with the mobile network according to the temporary data of the VSIM, store the temporary data of the VSIM; the writing module 307 is configured to write the temporary data that is of the VSIM and stored by the storage module 306 to a modem of the terminal device; the storage module 306 is further configured to, before the network processing module 303 registers with the mobile network according to the formal data of the VSIM, store the formal data of the VSIM; and the writing module 307 is further configured to write the stored formal data of the VSIM to the modem of the terminal device, so as to overwrite the temporary data of the VSIM that has been written to the modem.

The terminal device 300 provided in this embodiment may be configured to execute the technical solution of the method embodiment shown in FIG. 1, and implementation principles and technical effects of the solution are similar and are not described again.

Figure 4:
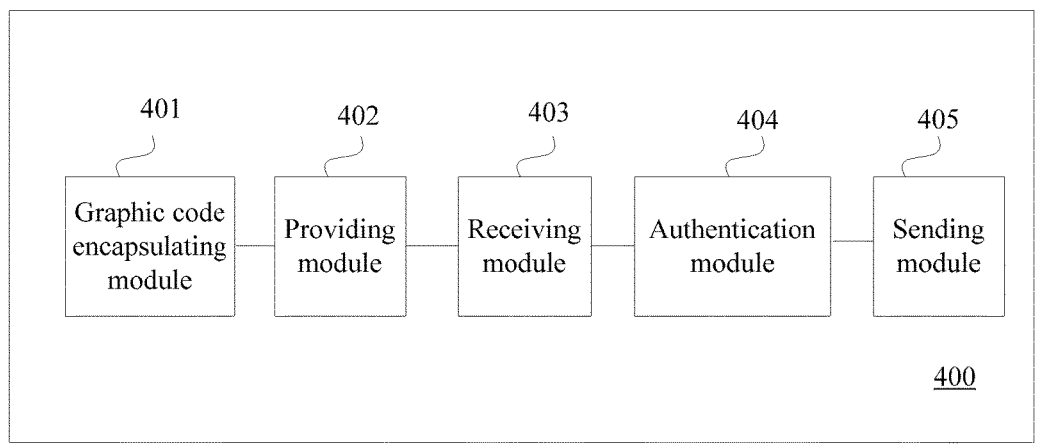
FIG. 4 is a schematic structural diagram of Embodiment 1 of a management server according to the present disclosure.

FIG. 4 is a schematic structural diagram of Embodiment 1 of a management server according to the present disclosure. As shown in FIG. 4, the management server 400 includes a graphic code encapsulating module 401, a providing module 402, a receiving module 403, an authentication module 404, and a sending module 405, where the graphic code encapsulating module 401 is configured to encapsulate temporary data of a VSIM and a service authentication code in a graphic code, where the service authentication code is used by a terminal device to download formal data of the VSIM; the providing module 402 is configured to provide the graphic code to a distribution client, so that the terminal device acquires the graphic code from the distribution client, further acquires the temporary data of the VSIM and the service authentication code, registers with a mobile network according to the temporary data of the VSIM, and sends, to the management server according to the service authentication code, a request for downloading the formal data of the VSIM; the receiving module 403 is configured to receive the request, sent by the terminal device, for downloading the formal data of the VSIM, where the request for downloading the formal data of the VSIM carries the service authentication code; the authentication module 404 is configured to perform authentication on the terminal device according to the service authentication code; and the sending module 405 is configured to, if the authentication module 404 passes the authentication, send formal data that is of the VSIM and corresponding to the service authentication code to the terminal device.

Preferably, before the sending module 405 sends the formal data that is of the VSIM and corresponding to the service authentication code to the terminal device, the authentication module 404 is further configured to determine that a state of the formal data that is of the VSIM and corresponding to the service authentication code is an unused state; and after the sending module 405 sends the formal data that is of the VSIM and corresponding to the service authentication code to the terminal device, the authentication module 404 is further configured to mark the state of the formal data of the VSIM as a used state.

Preferably, the graphic code is a two-dimensional code.

Optionally, after sending the formal data that is of the VSIM and corresponding to the service authentication code to the terminal device, the sending module 405 is further configured to send, to the mobile network, a request for deregistering the temporary data of the VSIM, so that an MSC on the mobile network deregisters the temporary data of the VSIM, and the terminal device registers with the mobile network according to the formal data of the VSIM.

The management server 400 provided in this embodiment may be configured to execute the technical solution of the method embodiment shown in FIG. 2, and implementation principles and technical effects of the solution are similar and are not described again.

Figure 5:
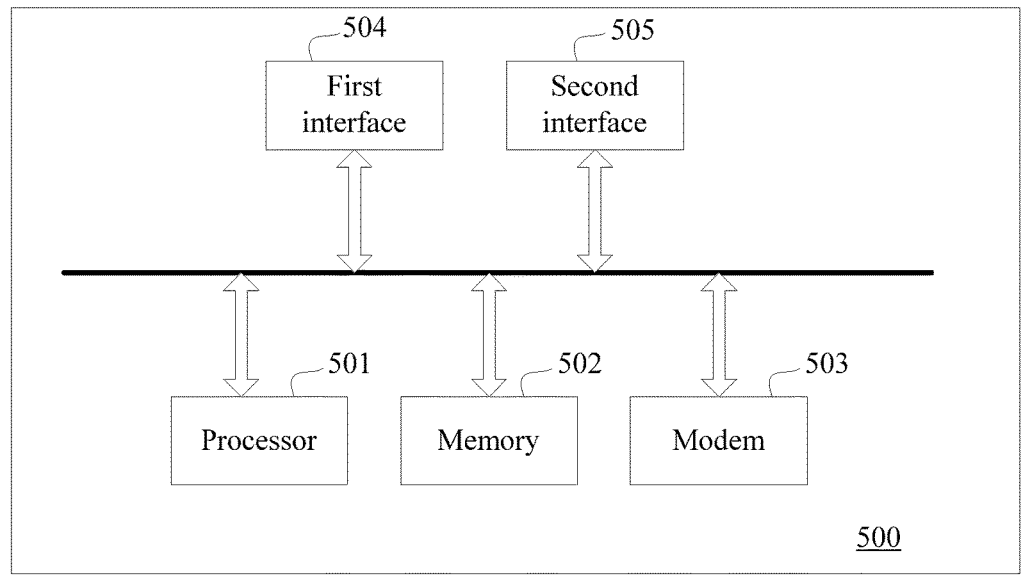
FIG. 5 is a schematic structural diagram of Embodiment 2 of a terminal device according to the present disclosure.

FIG. 5 is a schematic structural diagram of Embodiment 2 of a terminal device according to the present disclosure. As shown in FIG. 5, the terminal device 500 includes a processor 501, a memory 502, a modem 503, a first interface 504, and a second interface 505 that are connected using a bus (a thick solid line shown in FIG. 5), where the first interface 504 is configured to acquire a graphic code from a distribution client, where the graphic code includes temporary data of a VSIM and a service authentication code, and the graphic code is provided by a management server to the distribution client; the memory 502 is configured to store program code, and the processor 501 may perform the program code stored in the memory 502 so as to implement the following steps: acquiring, from the graphic code acquired by the first interface 504, the temporary data of the VSIM and the service authentication code that are included in the graphic code; storing, in the memory 502, the temporary data of the VSIM and the service authentication code, and writing the temporary data of the VSIM to the modem 503; invoking the second interface 505 so as to register with a mobile network according to the temporary data of the VSIM, and connect to the management server through the mobile network; send, to the management server, a request for downloading formal data of the VSIM, where the request for downloading the formal data of the VSIM carries the service authentication code, so that the management server performs authentication on the terminal device according to the service authentication code; and if the authentication is passed, the management server acquires formal data that is of the virtual subscriber identity module and corresponding to the service authentication code, and sends the formal data of the VSIM to the terminal device; and receive the formal data of the VSIM that is sent by the management server; storing, in the memory 502, the formal data of the VSIM that is received by the second interface 505, and writing the formal data of the VSIM to the modem 503, so as to overwrite the temporary data of the VSIM that has been written to the modem 503; and invoking the second interface 505 to register with the mobile network according to the formal data of the VSIM.

Preferably, the first interface 504 that is included in the terminal device 500 is a camera; and the processor 501 may invoke the camera to acquire the graphic code from the distribution client.

Further, the first interface that is included in the terminal device 500 may further be a USB interface, a BLUETOOTH interface, a WiFi network connection, and the like, which is not limited in the present disclosure.

The terminal device 500 provided in this embodiment may be configured to execute the technical solution of the method embodiment shown in FIG. 1, and implementation principles and technical effects of the solution are similar and are not described again.

Figure 6:
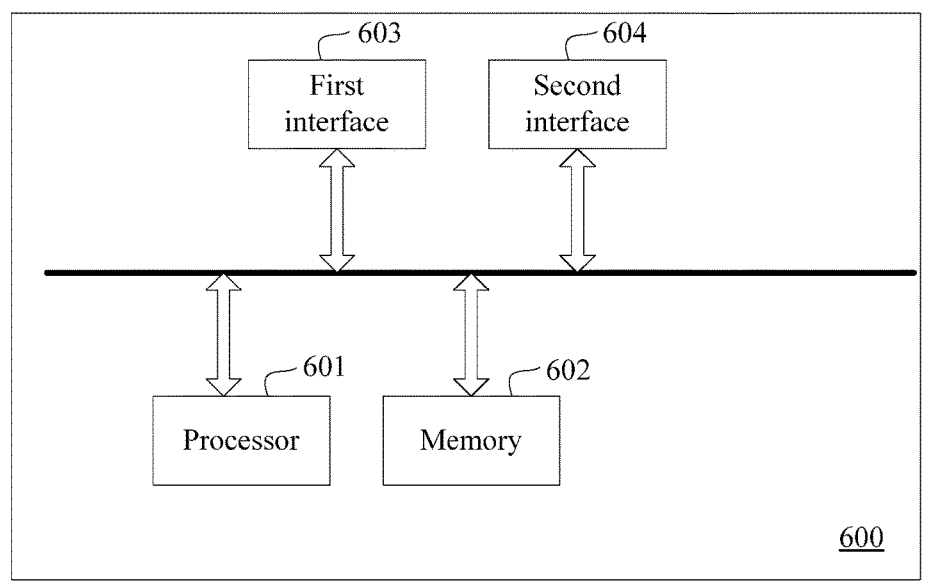
FIG. 6 is a schematic structural diagram of Embodiment 2 of a management server according to the present disclosure.

FIG. 6 is a schematic structural diagram of Embodiment 2 of a management server according to the present disclosure. As shown in FIG. 6, the management server 600 includes a processor 601, a memory 602, a first interface 603, and a second interface 604 that are connected using a bus (a thick solid line shown in FIG. 6), where the memory 602 may be configured to store temporary data of a VSIM, a service authentication code, formal data of the VSIM, and program code, and the processor 601 may perform the program code stored in the memory 602 so as to implement the following steps: encapsulating the temporary data of the VSIM and the service authentication code in a graphic code; invoking the first interface 603 to provide the graphic code to a distribution client, so that a terminal device acquires the graphic code from the distribution client, further acquires the temporary data of the VSIM and the service authentication code that are included in the graphic code, registers with a mobile network according to the temporary data of the VSIM, and sends, to the management server according to the service authentication code, a request for downloading the formal data of the VSIM; and the first interface 603 may be an Ethernet interface, or an antenna connector that has functions of receiving and sending, which is not limited in the present disclosure; invoking the second interface 604 to receive the request, sent by the terminal device, for downloading the formal data of the VSIM, where the request for downloading the formal data of the VSIM carries the service authentication code; performing authentication on the terminal device according to the service authentication code; determining that a state of the formal data that is of the VSIM and corresponding to the service authentication code is an unused state; if the authentication is passed and it is determined that the state of the formal data of the VSIM is the unused state, invoking the second interface 604 to send the formal data that is of the VSIM and corresponding to the service authentication code to the terminal device; and marking the state of the formal data of the VSIM as a used state.

The second interface 604 may be the antenna connector that has the functions of receiving and sending and interacts with the terminal device through the mobile network.

The management server 600 provided in this embodiment may be configured to execute the technical solution of the method embodiment shown in FIG. 2, and implementation principles and technical effects of the solution are similar and are not described again.

Figure 7:
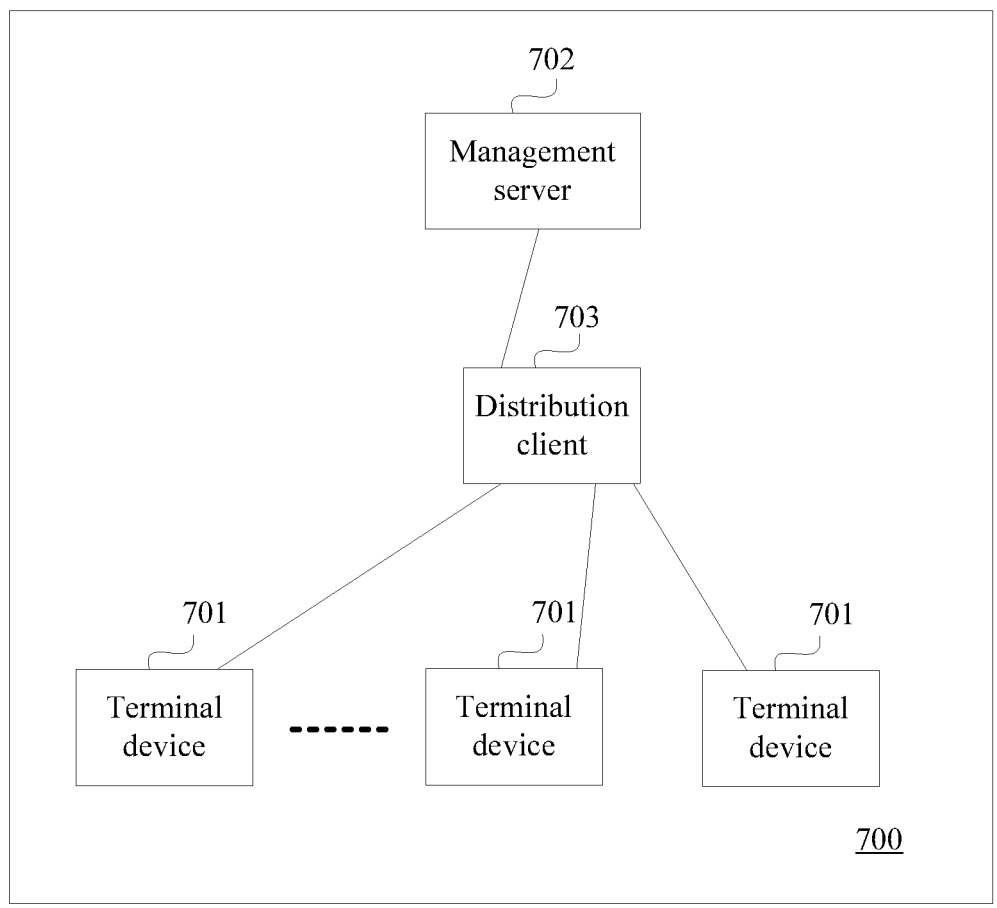
FIG. 7 is a schematic structural diagram of an embodiment of a system for distributing data of a VSIM according to the present disclosure.

FIG. 7 is a schematic structural diagram of an embodiment of a system for distributing data of a VSIM according to the present disclosure. As shown in FIG. 7, the system 700 for distributing the data of a VSIM includes at least one terminal device 701, a management server 702, and a distribution client 703, where the terminal device 701 may be the terminal device shown in FIG. 3 or FIG. 5 and may be configured to execute the technical solution of the method embodiment shown in FIG. 1; the management server 702 may be the management server shown in FIG. 4 or FIG. 6 and may be configured to execute the technical solution of the method embodiment shown in FIG. 2; and the distribution client 703 may be the distribution client in the method embodiment shown in FIG. 1 or FIG. 2, and implementation principles and technical effects of the solution are similar and details are not described again.

According to the descriptions of the embodiments, persons skilled in the art may clearly understand that the present disclosure may be implemented by hardware, firmware or a combination thereof. When the present disclosure is implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a computer. For example, the computer readable medium may include but is not limited to a random-access memory (RAM), a read-only memory (ROM), an electrically erasable programmable read-only memory (EEPROM), a compact disc read-only memory (CD-ROM), or another optical disc storage or magnetic disk storage medium, or another magnetic storage device, or any other medium that can carry or store desired program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure include a compact disc (CD), a laser disc, an optical disc, a digital versatile disc (DVD), a floppy disk and a BLU-RAY disc, where a disk generally replicates data magnetically and a disc replicates data optically using laser. The combination should also be included in the protection scope of the computer-readable medium.

Finally, it should be noted that the embodiments are merely intended for describing the technical solutions of the present disclosure, but not for limiting the present disclosure. Although the present disclosure is described in detail with reference to the embodiments, persons of ordinary skill in the art should understand that they may still make modifications to the technical solutions described in the embodiments or make equivalent replacements to some or all technical features thereof, without departing from the scope of the technical solutions of the embodiments of the present disclosure.

What is claimed is:

1. A method for distributing data of a virtual subscriber identity module, comprising:
    acquiring, by a terminal device, a graphic code, wherein the graphic code comprises temporary data of the virtual subscriber identity module and a service authentication code, and wherein the graphic code is provided by a management server;
    acquiring, by the terminal device, the temporary data of the virtual subscriber identity module and the service authentication code in the graphic code;
    connecting to the management server according to the temporary data of the virtual subscriber identity module;
    sending, by the terminal device, to the management server a request for downloading formal data of the virtual subscriber identity module, wherein the request for downloading the formal data of the virtual subscriber identity module carries the service authentication code, and wherein the formal data of the virtual subscriber identity module is acquired by the management server corresponding to the service authentication code when the authentication on the terminal device according to the service authentication code is passed;
    receiving, by the terminal device, the formal data of the virtual subscriber identity module from the management server; and
    registering, by the terminal device, to a mobile network according to the formal data of the virtual subscriber identity module.

2. The method according to claim 1, wherein the graphic code comprises a two-dimensional code.

3. The method according to claim 1, wherein acquiring, by the terminal device, the temporary data of the virtual subscriber identity module and the service authentication code in the graphic code comprises scanning, by the terminal device, the graphic code to acquire the temporary data of the virtual subscriber identity module and the service authentication code comprised in the graphic code.

4. The method according to claim 1, wherein acquiring, by the terminal device, the graphic code comprises acquiring, by the terminal device, the graphic code from a distribution client using a camera.

5. The method according to claim 1, further comprising registering, by the terminal device, to the mobile network according to the temporary data of the virtual subscriber identity module.

6. The method according to claim 1, wherein the graphic code comprises a two-dimensional code, and wherein the two-dimensional code is acquired by a camera.

7. A method for distributing data of a virtual subscriber identity module, comprising:
    encapsulating, by a management server, temporary data of the virtual subscriber identity module and a service authentication code in a graphic code;
    providing, by the management server, the graphic code to a distribution client such that the terminal device acquires the graphic code from the distribution client, wherein the temporary data of the virtual subscriber identity module and the service authentication code is acquired by the terminal device;
    receiving, by the management server, from the terminal device, a request for downloading formal data of the virtual subscriber identity module that carries the service authentication code, wherein the temporary data of a virtual subscriber identity module is used by the terminal device to connect to the management server;
    performing, by the management server, authentication on the terminal device according to the service authentication code; and
    sending, by the management server, the formal data of the virtual subscriber identity module corresponding to the service authentication code to the terminal device when the authentication is passed.

8. The method according to claim 7, further comprising:
    determining, by the management server, a state of the formal data of the virtual subscriber identity module corresponding to the service authentication code is an unused state before sending, by the management server, the formal data of the virtual subscriber identity module corresponding to the service authentication code to the terminal device; and
    marking, by the management server, the state of the formal data of the virtual subscriber identity module as a used state after sending, by the management server, the formal data of the virtual subscriber identity module corresponding to the service authentication code to the terminal device.

9. The method according to claim 7, wherein the graphic code comprises a two-dimensional code.

10. The method according to claim 7, wherein after sending, by the management server, the formal data of the virtual subscriber identity module to the terminal device, the method further comprises sending, by the management server to the mobile network, a request for deregistering the temporary data of the virtual subscriber identity module such that a mobile switching center (MSC) on the mobile network deregisters the temporary data of the virtual subscriber identity module, and the terminal device registers with the mobile network according to the formal data of the virtual subscriber identity module.

11. The method according to claim 7, wherein the graphic code comprises a two-dimensional code, and wherein the two-dimensional code is acquired by a camera.

12. A terminal device, comprising:
a memory;
a first interface;
a second interface; and
a processor coupled to the memory, the first interface, and the second interface;
wherein the first interface is configured to acquire a graphic code,
wherein the graphic code comprises temporary data of a virtual subscriber identity module and a service authentication code,
wherein the graphic code is provided by a management server,
wherein the memory is configured to store program code, and
wherein the processor executes the program code to implement the following steps:
  acquire, from the graphic code acquired by the first interface, the temporary data of the virtual subscriber identity module and the service authentication code comprised in the graphic code;
  store, in the memory, the temporary data of the virtual subscriber identity module and the service authentication code;
  invoke the second interface to:
    register with a mobile network according to the temporary data of the virtual subscriber identity module;
    connect to the management server through the mobile network;
    send, to the management server, a request for downloading formal data of the virtual subscriber identity module, wherein the request for downloading the formal data of the virtual subscriber identity module carries the service authentication code; and
    receive the formal data of the virtual subscriber identity module from the management server, wherein the formal data of the virtual subscriber identity module corresponding to the service authentication code is acquired by the management server when an authentication on the terminal device according to the service authentication code is passed;
  store, in the memory, the formal data of the virtual subscriber identity module received by the second interface; and
  invoke the second interface to register with the mobile network according to the formal data of the virtual subscriber identity module.

13. The terminal device according to claim 12, wherein the first interface comprises a camera, and wherein the processor invokes the camera to acquire the graphic code.

14. The terminal device according to claim 12, wherein the temporary data of the virtual subscriber identity module is temporarily valid and is deregistered after the terminal device reregisters to the mobile network according to the formal data of the virtual subscriber identity module.

15. The terminal device according to claim 12, wherein the graphic code comprises a two-dimensional code.

16. The terminal device according to claim 12, wherein the graphic code comprises a two-dimensional code, and wherein the two-dimensional code is acquired by a camera.

17. A management server, comprising:
a memory;
a first interface;
a second interface; and
a processor coupled to the memory, the first interface, and the second interface;
wherein the memory is configured to store temporary data of a virtual subscriber identity module, a service authentication code, formal data of the virtual subscriber identity module, and program instructions, and
wherein the processor executes the program instructions to implement the following steps:
  encapsulate the temporary data of the virtual subscriber identity module and the service authentication code in a graphic code;
  invoke the first interface to provide the graphic code to a distribution client such that a terminal device acquires the graphic code from the distribution client, wherein the graphic code comprises the temporary data of the virtual subscriber identity module and the service authentication code, and wherein the temporary data of the virtual subscriber identity module is used by the terminal device to register to a mobile network;
  invoke the second interface to receive a request for downloading the formal data of the virtual subscriber identity module, sent by the terminal device, wherein the request for downloading the formal data of the virtual subscriber identity module carries the service authentication code;
  perform authentication on the terminal device according to the service authentication code;
  determine that a state of the formal data of the virtual subscriber identity module corresponding to the service authentication code is an unused state;
  invoke the second interface to send the formal data of the virtual subscriber identity module corresponding to the service authentication code to the terminal device when the authentication is passed; and
  mark the state of the formal data of the virtual subscriber identity module as a used state.

18. The management server according to claim 17, wherein the graphic code comprises a two-dimensional code.

19. The management server according to claim 17, wherein after sending the formal data of the virtual subscriber identity module to the terminal device, the second interface is further configured to send, to the mobile network, a request for deregistering the temporary data of the virtual subscriber identity module such that a mobile switching center (MSC) on the mobile network deregisters the temporary data of the virtual subscriber identity module, and the terminal device registers with the mobile network according to the formal data of the virtual subscriber identity module.

20. The management server according to claim 17, wherein the graphic code comprises a two-dimensional code, and wherein the two-dimensional code is acquired by a camera.

\* \* \* \* \*